United States Patent
Sano

(10) Patent No.: US 6,322,188 B1
(45) Date of Patent: Nov. 27, 2001

(54) IMAGE RECORDING PROCESS FOR REALIZING IMAGE EXCELLENT IN LIGHT FASTNESS AND COLORING PROPERTY

(75) Inventor: Tsuyoshi Sano, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/623,350

(22) PCT Filed: Dec. 22, 1999

(86) PCT No.: PCT/JP99/07233

§ 371 Date: Sep. 1, 2000

§ 102(e) Date: Sep. 1, 2000

(87) PCT Pub. No.: WO00/40660

PCT Pub. Date: Jul. 13, 2000

(30) Foreign Application Priority Data

| Jan. 4, 1999 | (JP) | 11-000176 |
| Mar. 29, 1999 | (JP) | 11-086988 |
| Jun. 1, 1999 | (JP) | 11-154174 |

(51) Int. Cl.<sup>7</sup> ............ B41J 29/38; B41J 2/205; G01D 11/00
(52) U.S. Cl. ............... 347/15; 14/100
(58) Field of Search ............... 347/43, 100, 14, 347/15; 101/491

(56) References Cited

U.S. PATENT DOCUMENTS

| 4,695,846 | * | 9/1987 | Suzuki | 347/43 |
| 6,075,069 | * | 6/2000 | Takemoto | 523/160 |

FOREIGN PATENT DOCUMENTS

| 448055 | 9/1991 | (EP) . |
| 778321 | 6/1997 | (EP) . |
| 195093 | 4/1989 | (JP) . |
| 2127482 | 5/1990 | (JP) . |
| 1025440 | 1/1998 | (JP) . |
| 1112508 | 1/1999 | (JP) . |
| 11209672 | 8/1999 | (JP) . |
| 11228888 | 8/1999 | (JP) . |

OTHER PUBLICATIONS

Patent Abstracts of Japan 1–95093.
Patent Abstracts of Japan 2–127482.
Patent Abstracts of Japan 10–25440.
Patent Abstracts of Japan 11–228888.
Patent Abstracts of Japan 11–209672.
Patent Abstracts of Japan 11–12508.

* cited by examiner

*Primary Examiner*—Thinh Nguyen
(74) *Attorney, Agent, or Firm*—Ladas & Parry

(57) ABSTRACT

A high-density yellow portion is printed using an ink composition containing C.I. Pigment Yellow 74, and a low-density yellow portion is printed using a second yellow ink composition containing at least one yellow pigment selected from the group consisting of C.I. Pigment Yellow 109, 110, 128, 150, and 154. When the yellow ink composition containing C.I. Pigment Yellow 74 is used in combination with the second yellow ink composition according to the density of the yellow portion as described above, the light-fastness and color development of yellow images can be significantly improved.

7 Claims, No Drawings

IMAGE RECORDING PROCESS FOR REALIZING IMAGE EXCELLENT IN LIGHT FASTNESS AND COLORING PROPERTY

BACKGROUND OF THE INVENTION

1. Field of the Invention

The present invention relates to a recording method using yellow ink compositions, and more particularly to an ink jet recording method using yellow ink compositions.

2. Background Art

Various properties are required of images produced by ink compositions. One of them is lightfastness. When color images are formed using ink compositions, it is common practice to use at least magenta, yellow, and cyan inks. These inks should satisfy properties commonly required of ink compositions, for example, no change in composition and properties during storage. Additional requirements to be satisfied are such that sharp images are formed on recording materials and there is no deterioration in images during storage for a long period of time.

Further, in color images produced by a plurality of ink compositions, the presence of only one color having poor lightfastness leads to a change in hue of images and consequently extremely deteriorates the quality of color images. Thus, more controlled lightfastness is required of color ink compositions.

In recent years, ink jet recording printers have become widely spread. The ink jet recording method is a printing method wherein droplets of an ink composition are ejected and deposited on recording media, such as paper, to perform printing. The feature of the ink jet recording method is that images having high quality with high resolution can be printed at a high speed by means of a relatively inexpensive apparatus. In particular, color ink jet recording apparatuses can realize improved image quality, and have also become used as an output device for photographs and as a digital printer, a plotter, a CAD output device and the like. Images printed by means of ink jet recording printers, which have become widely used in the art, are considered utilizable in various forms. In particular, photograph-like prints are considered to be placed for display in a place exposed to light emitted from a fluorescent lamp or direct sunlight in the open or the like for a long period of time. Therefore, lightfastness is a very important property requirement to be satisfied by images produced by the ink jet recording method.

C.I. Pigment Yellow 74 has hitherto been widely used as a colorant for yellow ink compositions. Among pigment-based colorants, this pigment has exceptionally good yellow color development. However, there is still room for improvement in lightfastness.

Japanese Patent Laid-Open No. 25440/1998 proposes an ink composition for ink jet recording, containing C.I. Pigment Yellow 154. This publication, however, discloses neither the use of C.I. Pigment Yellow 74 in combination with C.I. Pigment Yellow 109, 110, 128, 150, or 154 nor advantages provided by this combination.

SUMMARY OF THE INVENTION

The present inventors have now found that combining a yellow ink containing C.I. Pigment Yellow 74 with a yellow ink containing C.I. Pigment Yellow 109, 110, 128, 150, or 154 under certain conditions for use in printing can significantly improve the lightfastness of yellow images. The present invention has been made based on such finding.

Accordingly, it is an object of the present invention to provide an image recording method which can form yellow images possessing excellent lightfastness and color development.

The image recording method according to the present invention is an image recording method using at least an ink composition containing C.I. Pigment Yellow 74 and a second yellow ink composition containing at least one yellow pigment selected from the group consisting of C.I. Pigment Yellow 109, 110, 128, 150, and 154, said method comprising the steps of: printing a high-density yellow portion using the ink composition containing C.I. Pigment Yellow 74; and printing a low-density yellow portion using an ink composition including the second yellow ink composition.

DETAILED DESCRIPTION OF THE INVENTION

The image recording method according to the present invention is a recoding method using an ink composition. Recording methods using an ink composition include, for example, an ink jet recording method, screen printing, recording methods with writing implements, such as pens, and other various printing methods. The present invention, particularly when applied to the ink jet recording method, can exhibit significant effect.

The recording method of the present invention uses at least an ink composition containing C.I. Pigment Yellow 74 and a second yellow ink composition containing at least one yellow pigment selected from the group consisting of C.I. Pigment Yellow 109, 110, 128, 150, and 154. In an image to be printed, a high-density yellow portion is printed using the ink composition containing C.I. Pigment Yellow 74, and a low-density yellow portion is printed using the second yellow ink composition. The image recording method according to the present invention can realize yellow images possessing excellent color development and lightfastness.

According to a preferred embodiment of the present invention, the high-density yellow portion is defined as a portion corresponding to a yellow density provided by printing an ink composition containing C.I. Pigment Yellow 74 at not more than 100% duty to more than 70% duty, and the low-density yellow portion is defined as a portion corresponding to a yellow density provided by printing an ink composition containing C.I. Pigment Yellow 74 at not more than 70% duty.

According to another preferred embodiment of the present invention, a medium-density yellow portion is printed using the ink composition containing C.I. Pigment Yellow 74 in combination with the second yellow ink composition. Preferably, a high-density yellow portion is defined as a portion corresponding to a yellow density provided by printing an ink composition containing C.I. Pigment Yellow 74 at not more than 100% duty to more than 75% duty, a low-density yellow portion is defined as a portion corresponding to a yellow density provided by printing an ink composition containing C.I. Pigment Yellow 74 at not more than 65% duty, and a medium-density yellow portion is defined as a portion corresponding to a yellow density provided by printing an ink composition containing C.I. Pigment Yellow 74 at not more than 75% duty to more than 65% duty. The high-density yellow portion is printed using the ink composition containing C.I. Pigment Yellow 74, the low-density yellow portion is printed using the second yellow ink composition, and the medium-density yellow portion is printed using the ink composition containing C.I. Pigment Yellow 74 in combination with the second yellow ink composition. According to this embodiment, yellow images possessing better color development and lightfastness can be realized.

The unit "duty" used herein refers to a unit of a value D defined and calculated by equation (I):

$$D = \frac{\text{number of actually printed dots}}{\text{longitudinal resolution} \times \text{transverse resolution}} \times 100 \text{ (duty)} \quad (I)$$

The yellow ink composition used in the present invention contains as a colorant C.I. Pigment Yellow 74 or C.I. Pigment Yellow 109, 110, 128, 150, or 154. The formulation of the ink composition except for the colorant may vary depending upon printing methods and recording methods.

According to a preferred embodiment of the present invention, the upper limit of the content of C.I. Pigment Yellow 74 as the colorant according to the present invention is not more than 10% by weight, more preferably not more than 7% by weight. The lower limit of the content of C.I. Pigment Yellow 74 is preferably not less than 1% by weight, more preferably not less than 2% by weight. For C.I. Pigment Yellow 74 or C.I. Pigment Yellow 109, 110, 128, 150, or 154, the upper limit of the content thereof is preferably not more than 10% by weight, more preferably not more than 7% by weight. The lower limit of the content thereof is preferably not less than 1% by weight, more preferably not less than 2% by weight.

According to a preferred embodiment of the present invention, C.I. Pigment Yellow 74 or C.I. Pigment Yellow 109, 110, 128, 150, or 154 is added, to the ink composition, as a pigment dispersion obtained by dispersing the pigment in an aqueous medium with the aid of a dispersant or a surfactant. Preferred dispersants include dispersants commonly used in the preparation of pigment dispersions, for example, polymeric dispersants. It would be apparent to a person having ordinary skill in the art that the dispersant and the surfactant contained in the pigment dispersion function also as the dispersant and the surfactant in the ink composition. Examples of preferred polymeric dispersants include naturally occurring polymeric compounds, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methylcellulose, carboxymethylcellulose, hydroxyethylcellulose, and ethylhydroxycellulose. Examples of preferred polymeric dispersants include synthetic polymeric compounds, and examples thereof include polyvinyl alcohols; polyvinyl pyrrolidones; acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer; styrene/acryl resins, such as styrene/acrylic acid copolymer, styrene/methacrylic acid copolymer, styrene/methacrylic acid/acrylic ester copolymer, styrene/α-methylstyrene/acrylic acid copolymer, and styrene/α-methylstyrene/acrylic acid/acrylic ester copolymer; styrene/maleic acid copolymer; styrene/maleic anhydride copolymer; vinylnaphthalene/acrylic acid copolymer; vinylnaphthalene/maleic acid copolymer; vinyl acetate copolymers, such as vinyl acetate/ethylene copolymer, vinyl acetate/fatty acid vinylethylene copolymer, vinyl acetate/maleic ester copolymer, vinyl acetate/crotonic acid copolymer, and vinyl acetate/acrylic acid copolymer; and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

A preferred solvent for the yellow ink composition usable in the recording method according to the present invention comprises water and a water-soluble organic solvent. The water-soluble organic solvent is preferably a low-boiling organic solvent, and examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time required for drying the ink. The amount of the low-boiling organic solvent added is preferably 1 to 20% by weight, more preferably 1 to 10% by weight, based on the ink composition.

According to a preferred embodiment of the present invention, the ink composition to be used in the present invention further comprises a wetting agent comprising a high-boiling organic solvent. Preferred examples of high-boiling organic solvents usable herein include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably 2 to 30% by weight, more preferably 5 to 20% by weight, based on the ink composition.

The yellow ink composition used in the recording method of the present invention may contain a saccharide. Preferred saccharides include: monosaccharides; disaccharides; oligosaccharides including trisaccharides and tetrasaccharides; and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein means saccharides in the broad sense as including substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol. The content of the saccharide is preferably about 1 to 10% by weight based on the ink composition.

The yellow ink compositions to be used in the present invention may further contain a surfactant. Examples of surfactants usable herein include: anionic surfactants, for example, sodium dodecylbenzenesulfonate, sodium laurylate, and ammonium salt of polyoxyethylene alkyl ether sulfates; and nonionic surfactants, for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylene-alkylamides. Further, acetylene glycol (OLFINE Y, Surfynol 82, Surfynol 104, Surfynol 440, Surfynol 465, and Surfynol 485 (all the above products being manufactured by Air Products and Chemicals Inc.) may also be used. They may be used alone or in combination of two or more.

If necessary, other additives, for example, pH adjustors, preservatives, fungicides, and phosphorus antioxidants, may be added to the ink composition used in the present invention.

The ink composition may be prepared by dispersing and mixing the above ingredients together by means of a suitable method. Preferably, the pigment, the polymeric dispersant, and water are first mixed together by means of a suitable dispergator, for example, a ball mill, a sand mill, an attritor, a roll mill, an agitator mill, a Henschel mixer, a colloid mill, an ultrasonic homogenizer, a jet mill, or an angmill, to prepare a homogeneous pigment dispersion. Subsequently, water, a water-soluble organic solvent, a saccharide, a pH adjustor, a preservative, a fungicide and the like are added to and satisfactorily dissolved in the pigment dispersion to prepare an ink solution. After thorough stirring, the ink solution is filtered to remove coarse particles and foreign matter causative of nozzle clogging to obtain a contemplated ink composition.

According to the recording method of the present invention, the yellow ink compositions described above may be used with other color ink composition(s) to perform image recording. Other color ink compositions include black, cyan, and magenta ink compositions. Thus, according to another aspect of the present invention, there is provided an ink set for use in the image recording method according to the present invention, comprising the yellow ink compositions and other color ink composition(s). According to a preferred embodiment of the present invention, the ink set comprises the yellow ink compositions, a cyan ink composition, a magenta ink composition, and optionally a black ink composition. For these other ink compositions, the colorant and other ingredients may be properly determined by taking a printing method into consideration.

EXAMPLES

The present invention will be described in more detail with reference to the following examples, though it is not limited to these examples only. In the following examples, "%" is by weight unless otherwise specified.

Preparation of inks

Pigment-based ink compositions having the following formulations were prepared according to the following procedure. The pigment and the resin as a dispersant were first mixed together, and the mixture, together with glass beads (diameter: 1.7 mm, amount: 1.5 times (by weight) larger than the mixture), was dispersed for 2 hr in a sand mill manufactured by Yasukawa Seisakusho. Thereafter, the glass beads were removed, and other additives were added, followed by stirring at room temperature for 20 min. The mixture was filtered through a 5-μm membrane filter to prepare an ink composition.

| Yellow ink 1 | |
| --- | --- |
| C.I. Pigment Yellow 74 | 3.5% |
| Styrene/acrylic acid copolymer | 1.2% |
| | (solid basis) |
| Glycerin | 13% |
| Ethylene glycol | 8% |
| Surfynol 465 | 1% |
| Triethylene glycol monobutyl ether | 5% |
| Triethanolamine | 0.7% |
| Pure water | Balance |
| Yellow ink 2-1 | |
| C.I. Pigment Yellow 154 | 4.0% |
| Styrene/acrylic acid copolymer | 1.3% |
| | (solid basis) |
| Glycerin | 10% |
| Diethylene glycol | 10% |
| Surfynol 465 | 0.8% |
| Diethylene glycol monobutyl ether | 4% |
| Triethanolamine | 0.9% |
| Pure water | Balance |
| Yellow ink 2-2 | |
| C.I. Pigment Yellow 128 | 4.2% |
| Styrene/acrylic acid copolymer | 1.2% |
| (molecular weight 10,000, acid | (solid basis) |
| value 140) | |
| Glycerin | 12% |
| Ethylene glycol | 8% |
| Triethanolamine | 0.9% |
| Surfynol 465 | 0.8% |
| Triethylene glycol monobutyl ether | 7% |
| Pure water | Balance |
| Yellow ink 2-3 | |
| C.I. Pigment Yellow 109 | 3.0% |
| Styrene/acrylic acid copolymer | 0.9% |
| | (solid basis) |
| Glycerin | 13% |
| Ethylene glycol | 8% |
| Triethanolamine | 0.8% |
| Surfynol 465 | 1% |
| Triethylene glycol monobutyl ether | 7% |
| Pure water | Balance |
| Yellow ink 2-4 | |
| C.I. Pigment Yellow 110 | 3.1% |
| Styrene/acrylic acid copolymer | 0.9% |
| | (solid basis) |
| Glycerin | 10% |
| Diethylene glycol | 12% |
| Triethanolamine | 0.7% |
| Surfynol 465 | 1% |
| Triethylene glycol monobutyl ether | 5% |
| Pure water | Balance |
| Yellow ink 2-5 | |
| C.I. Pigment Yellow 150 | 3.1% |
| Styrene/acrylic acid copolymer | 1.1% |
| | (solid basis) |
| Glycerin | 15% |
| Ethylene glycol | 8% |
| Surfynol 465 | 1% |
| Triethylene glycol monobutyl ether | 8% |
| Pure water | Balance |
| Magenta ink | |
| C.I. Pigment Red 122 | 3.0% |
| Styrene/acrylic acid copolymer | 0.9% |
| | (solid basis) |
| Glycerin | 11% |
| Diethylene glycol | 8% |
| Surfynol 465 | 1% |
| Triethylene glycol monobutyl ether | 7% |
| Triethanolamine | 0.5% |
| Pure water | Balance |
| Cyan ink | |
| C.I. Pigment Blue 15:3 | 2.2% |
| Styrene/acrylic acid copolymer | 0.9% |
| | (solid basis) |
| Glycerin | 12% |

-continued

| | |
|---|---|
| Diethylene glycol | 10% |
| Surfynol 465 | 0.8% |
| Triethylene glycol monobutyl ether | 7% |
| Triethanolamine | 0.7% |
| Pure water | Balance |

Image Example 1

The ink compositions prepared above were used to form blotted images of yellow and color images having a light yellow portion like the skin of a human being. In the formation of color images, the following image processing was carried out based on a yellow density provided by printing yellow ink 1 at 100% duty. Specifically, in the color images, a portion corresponding to a yellow density provided by printing yellow ink 1 at not more than 100% duty to more than 75% duty was printed using yellow ink 1, a portion corresponding to a yellow density provided by printing yellow ink 1 at not more than 65% duty was printed using yellow ink 2-1, 2-2, 2-3, 2-4, or 2-5, and a portion corresponding to a yellow density provided by printing yellow ink 1 at not more than 75% duty to more than 65% duty was printed using a combination of yellow ink 1 and yellow ink 2-1, 2-2, 2-3, 2-4, or 2-5 in a ratio suitable for realizing a required color density.

The printing was carried out by means of an ink jet printer "MJ-930C," manufactured by Seiko Epson Corporation, under conditions of a weight of ink ejected of 0.040 μg/dot and a resolution of 360 dpi×360 dpi.

Image Example 2

A blotted image of yellow and a color image having a light yellow portion like the skin of a human being were formed in the same manner as in Image Example 1, except that only yellow ink 1 was used.

Evaluation 1: Image quality immediately after printing

The images produced in Image Examples 1 and 2 had excellent color development, and visual inspection showed that there was no difference in quality among the images.

Evaluation 2: Evaluation of lightfastness

The prints produced in Image Examples 1 and 2 were exposed to light, and the lightfastness of the images was evaluated as follows. Specifically, a xenon weather-o-meter Ci35A manufactured by Atlas was used for light irradiation, and the prints were exposed to light under conditions of black panel temperature 63° C., relative humidity 50%, and ultraviolet light (340 nm) irradiance of 0.35 W/m$^2$. The dose was 360 kJ/m$^2$ (light irradiation under the above conditions for 284 hr) or 720 kJ/m$^2$ (light irradiation under the above conditions for 568 hr).

The results were evaluated according to the following criteria.

A: Visual inspection showed that there was no difference in image quality between before and after light irradiation.

B: Visual inspection showed that there was a difference in image quality between before and after light irradiation.

C: Visual inspection showed that light irradiation clearly deteriorated image quality.

The results of evaluation were as summarized in Table 1 below.

TABLE 1

| Yellow ink | | Image Ex. 1 | | | | | Image Ex. 2 |
|---|---|---|---|---|---|---|---|
| | | 2-1 | 2-2 | 2-3 | 2-4 | 2-5 | 1 only |
| Results | 360 kJ/m$^2$ | A | A | A | A | A | A |
| | 720 kJ/m$^2$ | A | A | A | A | A | C |

What is claimed is:

1. An image recording method using at least an ink composition containing C.I. Pigment Yellow 74 and a second yellow ink composition containing at least one yellow pigment selected from the group consisting of C.I. Pigment Yellow 109, 110, 128, 150, and 154, said method comprising the steps of:

printing a high-density yellow portion using the ink composition containing C.I. Pigment Yellow 74; and
  printing a low-density yellow portion using an ink composition including the second yellow ink composition.

2. The method according to claim 1, wherein a high-density yellow portion defined as a portion corresponding to a yellow density provided by printing an ink composition containing C.I. Pigment Yellow 74 at not more than 100% duty to more than 70% duty is printed using the ink composition containing C.I. Pigment Yellow 74, and a low-density yellow portion defined as a portion corresponding to a yellow density provided by printing an ink composition containing C.I. Pigment Yellow 74 at not more than 70% duty is printed using the second yellow ink composition.

3. The method according to claim 1, wherein a medium-density yellow portion is printed using the ink composition containing C.I. Pigment Yellow 74 in combination with the second yellow ink composition.

4. The method according to claim 3, wherein a high-density yellow portion defined as a portion corresponding to a yellow density provided by printing an ink composition containing C.I. Pigment Yellow 74 at not more than 100% duty to more than 75% duty is printed using the ink composition containing C.I. Pigment Yellow 74, a low-density yellow portion defined as a portion corresponding to a yellow density provided by printing an ink composition containing C.I. Pigment Yellow 74 at not more than 65% duty is printed using the second yellow ink composition, and a medium-density yellow portion defined as a portion corresponding to a yellow density provided by printing an ink composition containing C.I. Pigment Yellow 74 at not more than 75% duty to more than 65% duty is printed using the ink composition containing C.I. Pigment Yellow 74 in combination with the second yellow ink composition.

5. The method according to claim 1, which is performed by an ink jet recording method comprising the steps of: ejecting droplets of an ink composition; and depositing the droplets onto a recording medium to perform printing.

6. A record produced by the recording method according to claim 1.

7. An ink set for use in the recording method according to claim 1, said ink set comprising at least an ink composition containing C.I. Pigment Yellow 74 and a second yellow ink composition containing at least one yellow pigment selected from the group consisting of C.I. Pigment Yellow 109, 110, 128, 150, and 154.

* * * * *